Figure 1:
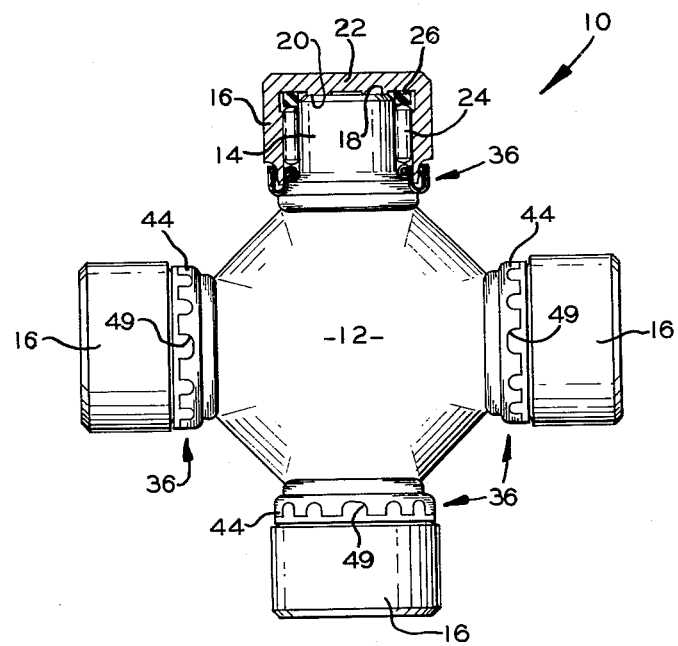

United States Patent Office 3,138,942
Patented June 30, 1964

3,138,942
UNIVERSAL JOINT BEARING SEAL
John A. Kayser, Oregon, Ohio, assignor to Dana Corporation, Toledo, Ohio, a corporation of Virginia
Filed Jan. 21, 1963, Ser. No. 252,655
7 Claims. (Cl. 64—17)

This invention relates to universal joints of the type in which rotary members are connected by bifurcations thereon embracing and pivotally connected in transverse planes to the trunnions of a journal cross member. Usually, the furcations of the members are provided with radially extending aligned openings in which the trunnions of the journal cross are positioned. Interposed between the trunnions and the furcations are cup-shaped bearing races, the periphery of which engage the furcations and including an annulus of needle bearings interposed between the inner diameter of the bearing race and the trunnion so that substantially frictionless movement may take place between the trunnion and the bearing race.

More particularly, this invention is directed to a sealing means for sealing the opening between the open end of the bearing race and the trunnion so that lubricant is retained in the bearing race and dirt and foreign matter is excluded from penetrating within the same. It is also a feature of this invention that a portion of said sealing means is adapted to engage and position the annulus of needle rollers.

Prior art means for sealing the junction of the open end of the bearing race and the trunnion have taken many forms. The earliest constructions were merely metallic elements which fixedly engaged either the trunnion or the bearing race and slidingly engage the other. However, such a construction leaves much to be desired in that due to the accumulation of tolerances and as a result of wear, such a seal did not always make satisfactory contact with the race or the trunnion so that an imperfect seal was obtained. Later developments in the art included a resilient element formed so as to engage the trunnion and also engage either the periphery or the radially inner end of the bearing race. This type of a seal also did not operate satisfactorily because of the fact that after being exposed to the elements and to wear, the resilient means became undersize and lost its resiliency so that a satisfactory seal was no longer obtained.

Still later developments in the art reveal a resilient element for engaging either one or both of the trunnions and bearing race and including a metallic portion which overlies the resilient material so as to protect it from the elements and compress the same against the bearing race and trunnion thereby insuring a continued fitting relationship therebetween even after prolonged exposure to the elements or wear. However, the majority of these seals merely engage the bearing race on the periphery or radially inner end thereof so that unsatisfactory sealing relationship existed.

In other prior art seals, the resilient portion of the seal was adapted to engage both the periphery of the bearing race and the internal diameter thereof in addition to a metallic portion of the seal engaging the trunnion of the journal cross. Such construction results in a better sealing relationship; however, several problems are still presented; such as, the metallic portion of the seal did not properly secure the engagement of the resilient material with both the periphery and the inner diameter of the bearing race and additionally since the seal projects within the bearing race there was a tendency for the annulus of needle bearings contained therein to abut the resilient material and to be subject to a frictional retardation of the rolling action thereof. This required the addition of a separate metallic element disposed between the seal and the needle bearings to prevent engagement therebetween.

It is, therefore, an object of this invention to provide a seal for sealing the area between the open end of the bearing race and the trunnion, which seal will retain lubricant within the bearing race and prevent the ingress of contaminants therein.

It is another object of this invention to provide such a seal including resilient elastomeric material which engages both the periphery and the inner diameter of the seal and includes means whereby the annulus of needle bearings therein does not frictionally engage the resilient portion of the seal.

It is yet another object of this invention to provide such a seal which includes a resilient portion and a metallic portion, said metallic portion being in a press fit relationship with the trunnion of the journal cross and the resilient material portion engaging both the periphery and the inner diameter of the bearing race and wherein the metallic portion of the seal is adapted to press the resilient material into engagement with both the periphery and the internal diameter thereof and further is adapted to maintain the annulus of needle bearings from engaging the resilient portion of the sealing means.

It is yet a still further object of this invention to provide a sealing means for sealing the area between the open end of a bearing race and the journal cross trunnion upon which the same is mounted wherein the sealing means includes a metallic portion having a substantially C-shaped cross section and having resilient material therein, wherein the resilient material is adapted to engage the periphery and the internal diameter of the bearing race, and wherein the metallic portion of the seal biases the above resilient material into engagement with the bearing race, and further wherein the metallic portion of the seal extends beyond the open end of the bearing race both internally and externally thereof to pressingly engage the resilient material against the bearing race, and further wherein the metal portion of the seal within the bearing race projects beyond the resilient material and is adapted to engage the annulus of needle bearings to maintain the same from engaging the resilient material and being frictionally retarded thereby.

It is yet a still further object of this invention to provide such a sealing means including a metallic portion and a resilient portion wherein the metallic portion of the seal external of the bearing race is formed with a plurality of radially extending fingers to provide further flexibility of the external portion of the seal.

Figure 2:
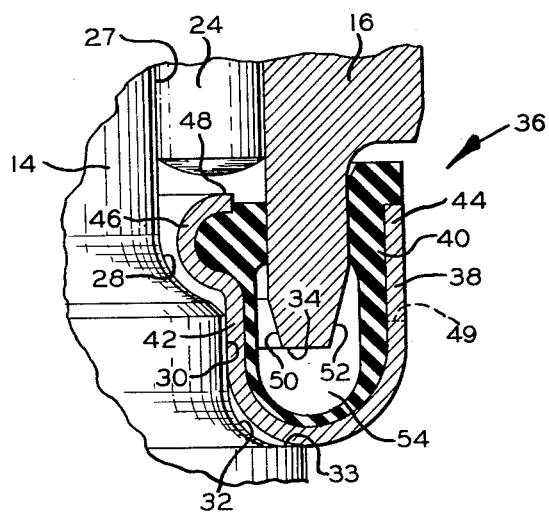

Other and further objects of this invention will become apparent upon a consideration of the specification when taken in conjunction with the following drawings wherein:

FIG. 1 is a view partially in section of the seal of this invention used in conjunction with a journal cross having four trunnions thereon with bearing races mounted on the trunnions; and FIG. 2 is a partial sectional view of the area at the open end of one of the bearing races and the portion of the trunnion disposed adjacent thereto and the sealing means sealingly engaging the opening therebetween.

Referring to the drawings, the journal cross shown generally at 10 includes a central body portion 12 having four trunnions 14 extending therefrom in a circumferentially equally spaced relationship. Disposed on each trunnion is a cup-shaped bearing race 16 which is each adapted to be secured in a suitable manner to a furcation of a universal joint member (not shown).

The radially outer end 18 of the trunnion 14 and the radially inner surface 20 of the closed end 22 of the bearing race 16 slidingly engage each other in a thrusting relationship. The periphery of the trunnion 14 and the inner diameter of the bearing race 16 are spaced from each other, and disposed within said space is an annulus of needle bearings 24 adapted to rollingly engage the bearing race and the trunnion thereby providing substantially frictionless rotation therebetween. Between the radially outer end of the needle bearings 24 and the inner surface 20 is an annular spacer member 26 made from "Nylon," "Delrin" or the like to provide low friction engagement of the radially outer end of the needle bearing.

The trunnions 14 are provided with a first radius 28 which lies at the junction of the needle bearing engaging diameter 27 and the seal engaging diameter 30 and a second radius 32 lying at the junction of the latter diameter and annular shoulder 33 formed at the base of the trunnion adjacent the body portion 12 of the journal cross 10. Preferably, the radially inner end 34 of the bearing race 16 overlies the seal engaging diameter 30.

Sealing means shown generally at 36 is provided to seal the opening which exists between the open end of the bearing race 16 and the trunnion 14. The sealing means 36 includes an annular metallic portion 38 and an annular resilient elastomeric portion 40 which are bonded together to form a unitary structure. More particularly, the metallic portion 38 is substantially "C-shaped" in cross-section and engages the shoulder 33 and the seal engaging diameter 30 of the trunnion 14 while being spaced from the radius 32. The spacing from the radius 32 is provided to insure at least a two-point engagement between the metallic portion 38 and the trunnion 14, for, if the radius were engaged, it is possible that due to dimensional tolerances this would be the sole point of engagement. In assembling the seal 36 on the trunnion 14, it is desirable that an interference fit exist between the metallic portion 38 and the seal engaging diameter 30 to insure proper sealing and that the metallic portion 38 be pressed securely against the shoulder 33. The radially outer portions of both the inner and outer lips 42 and 44 respectively of the metallic portion 38 extend radially beyond the inner end 34 of the bearing race 16.

The resilient elastomeric portion 40 of the sealing means 36 lies on the inner periphery of the metallic portion 38 and is interposed between the lip 44 and the outer periphery of the bearing race 16 and between the lip 42 and the inner diameter of the bearing race 16. The resilient elastomeric portion 40 lying at the radially inward part of the sealing means 36 and not between the lips 42 and 44 and the bearing race 16 may be omitted if desired, but has been shown as a continuous structure for manufacturing purposes. The lip 42 at its radially outer end has a portion 46 thereof formed concavely with respect to the bearing race 16 so as to provide for a greater volume of elastomeric material at this location than would be the case if the lip 42 extended radially straight. Additionally, the extension of the lip 42 beyond the elastomeric portion 40 provides a metallic shoulder 48 at the radially outward end of the sealing means 36 within the bearing race 16 to engage the radially inward end of the needle bearings 24 thereby preventing the latter from engaging the elastomeric portion 40 and being frictionally retarded in their rotation thereby. As shown in FIG. 2, the needle bearings 24 are spaced from the shoulder 48, however, the needle bearings 24 are free to move radially and at certain stages of operation will engage the shoulder 48.

The outer lip 44 of the metallic portion 38 is preferably formed with a plurality of radially extending U-shaped slots 49 so that the lip 44 is more easily resiliently deformed during the assembly of the sealing means 36 on the bearing race 16 than would be the case if the lip 44 were of a circumferentially uninterrupted configuration.

The thickness of the resilient elastomeric portion 40 of the sealing means 36 is controlled so that when the bearing race 16 is pressed therebetween the elastomeric portion is compressed between the bearing race 16 and the metallic portion 38 to insure a satisfactory seal therebetween. To aid in assembly, the inner and outer surfaces of the bearing race 16 adjacent the inner end 34 thereof are tapered as shown at 50 and 52 respectively.

It is readily apparent with the above construction, that a labyrinth seal is formed between the sealing means 36 and the bearing race 16 and if contaminants are able to pass between the outer periphery of the bearing race 16 and the sealing means 36, the same will lie in the chamber 54 and must still pass the engagement between the sealing means 36 and the inner diameter of the bearing race 16 to penetrate the bearing race 16 and contaminate the lubricant contained therein. Additionally, the resilient elastomeric portion 40 is pressed against the bearing race 16 from both the inside and outside by the metallic portion 38 thereby insuring a continuous satisfactory seal therebetween, while the interference fit between the metallic portion 38 and the trunnion insures a satisfactory seal in this location.

It is well known that upon exposure to the elements and physical abuse, resilient elastomeric material will be subject to a loss of resiliency; accordingly, if it were not for the constant pressing of the metallic portion 38 against the resilient elastomeric portion 40, after a period of service, the elastomeric portion 40 would no longer properly engage the bearing race 16.

While only a single embodiment of this invention has been shown and described, it is apparent that many changes can be made in the structure thereof, and it is understood that this description is illustrative only and not for the purpose of rendering this invention limited to the details illustrated or described except insofar as they have been limited by the terms of the following claims.

What is claimed is:

1. Sealing means for sealing the opening between a trunnion and the open end of a needle bearing containing bearing race of the universal joint comprising in combination an annular metallic element having a substantially C-shaped cross section thereby defining a base portion and a pair of spaced annular lip portions extending radially outwardly therefrom, said metallic element engaging said trunnion and having both lip portions thereof extending radially outwardly beyond the radially inward end of said bearing race and spaced therefrom, one of said lips being positioned internally and the other of said lips being positioned externally of said bearing race, and resilient elastomeric material bonded to said metallic element and disposed between said one lip portion and the inner surface of said bearing race and between said second lip portion and the periphery of said bearing race, said lip portions pressing said resilient elastomeric material against said bearing race, whereby said opening is effectively sealed.

2. Sealing means according to claim 1 wherein said one lip portion extends radially outwardly beyond said resilient elastomeric material between the same and said bearing race whereby said one lip is operable to engage the radially inner end of needle bearings disposed within said bearing race.

3. Sealing means according to claim 1 wherein said outer lip portion is provided with a plurality of radially inwardly extending slots whereby said other lip portion is rendered more resiliently deformable.

4. Sealing means according to claim 2 wherein said other lip portion is formed with a plurality of radially inwardly projecting slot portions whereby said other lip portion is rendered more resiliently deformable.

5. Sealing means for sealing the opening between a trunnion and the open end of a needle bearing containing bearing race of a universal joint wherein said trunnion has a cylindrical needle bearing engaging portion and a seal engaging portion adjacent the base thereof which is of greater diameter than said needle engaging portion comprising in combination an annular metallic element having a substantially C-shaped cross section thereby defining a base portion and a pair of spaced lip portions extending radially outwardly therefrom, said metallic element engaging said seal engaging portion of said trunnion and having the lip portions thereof extending radially outwardly beyond the radially inward end of said bearing race and spaced therefrom with one lip being internal and the other lip being external of said bearing race, the radially outer portion of said one lip being formed concavely with respect to the inner surface of said bearing race, and resilient elastomeric material bonded to said metallic element and disposed between said one lip portion and the inner surface of said bearing race and between said second lip portion and the periphery of said bearing race, said lip portions pressing said resilient elastomeric portions against said bearing race whereby said opening is effectively sealed, and the radially outward portion of said concave portion of said one lip extends radially outwardly beyond said resilient elastomeric material bonded thereto and being adapted to engage the radially inner end of the needle bearings contained within said bearing race.

6. Sealing means according to claim 5 wherein said other lip portion is formed with a plurality of radially inwardly extending slots whereby said other lip portion is rendered more resiliently deformable.

7. Sealing means for sealing the opening between a trunnion of a journal cross and the open end of a needle bearing containing bearing race of universal joint wherein said trunnion has a cylindrical needle bearing engaging diameter and a seal engaging diameter of greater diameter than said needle engaging diameter, a first radius joining said needle engaging diameter and said seal engaging diameter, an annular shoulder joining said seal engaging diameter and the body of said journal cross and a second radius joining said seal engaging diameter and said shoulder, comprising in combination an annular metallic element having a substantially C-shaped cross section thereby defining a base portion and a pair of spaced lip portions extending radially outwardly therefrom, said metallic element being spaced from said second radius while the base portion thereof engages said shoulder and the inner lip portion thereof engages said seal engaging portion, said metallic element having both lip portions thereof extending radially outwardly beyond the radially inner end of said bearing race and spaced therefrom with one lip being internal and the other lip being external of said bearing race, said radially inward portion of said bearing race overlying said seal engaging diameter, said internal lip portion having the radially outward portion thereof formed concavely with respect to the inner wall of said bearing race and being spaced from said needle engaging portion of said trunnion, and resilient elastomeric material bonded to said metallic element and disposed between said internal lip portion and the inner surface of said bearing race and between said external lip portion and the periphery of said bearing race, said lip portions pressing said resilient elastomeric material against said bearing race whereby said opening is effectively sealed, said concave portion of said inner lip extending radially outwardly beyond said resilient elastomeric material and being adapted to engage the radially inner end of the needle bearings contained within said bearing race.

References Cited in the file of this patent
UNITED STATES PATENTS

| 1,943,814 | Cutting | Jan. 16, 1934 |
| 2,244,380 | Warner | June 3, 1941 |
| 2,773,367 | Slaght | Dec. 11, 1956 |